Figure 1:
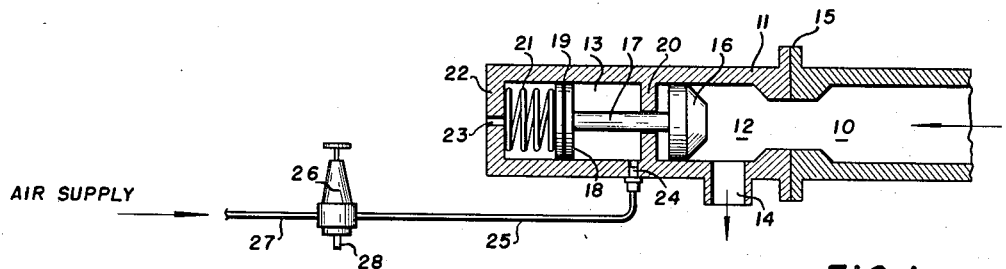

Dec. 27, 1955   R. R. CROOKSTON ET AL   2,728,547
MUD RELEASE VALVE
Filed Nov. 24, 1950

INVENTOR.
Harold F. Griffin,
BY Robert R. Crookston,

AGENT.

United States Patent Office 2,728,547
Patented Dec. 27, 1955

2,728,547

MUD RELEASE VALVE

Robert R. Crookston and Harold F. Griffin, Houston, Tex., assignors, by mesne assignments, to Esso Research and Engineering Company, Elizabeth, N. J., a corporation of Delaware Application November 24, 1950, Serial No. 197,424

1 Claim. (Cl. 251—28)

The present invention is directed to a mud release valve. More particularly, the invention is directed to a mud release valve which is adapted to be used in conjunction with mud pumps. The invention is specifically directed to the employment of a mud release valve for releasing mud into a mud or slush pit.

The present invention is a continuation-in-part of Serial No. 91,708, filed May 6, 1949, now U. S. Patent 2,632,631, issued March 24, 1953, in the names of Harold F. Griffin and Robert R. Crookston and entitled "Drilling Mud Flow System."

The principal parts of the apparatus of the present invention embodying a mud release valve comprise, in combination, a housing defining first and second chambers. The first chamber has an inlet for the admission of mud thereto and an outlet for discharge of mud therefrom. A first piston is arranged in the first chamber in a position normally to close the inlet and a second piston is arranged in the second chamber; the pistons are connected by an elongated member which is slidably arranged in an opening in a wall member in the housing between the chambers. The release valve is provided with a valve which has a first conduit defining a passageway connected to a source of fluid at a constant pressure and adapted to deliver same to said valve. The valve is also provided with means for exhausting fluid to the atmosphere. A second conduit connected to the valve is adapted to deliver fluid to and exhaust fluid from the second piston. The second piston is provided with motivating means to cause movement thereof and corresponding movement of the first piston. The motivating means may be a conduit defining a passageway adapted to deliver a fluid under pressure to the second chamber ahead of said second piston or the second chamber may be provided with a compression means, such as a helical coil spring, which urges the second piston in a direction to cause movement of the first piston to close the inlet.

The apparatus of the present invention is adapted to be connected to the pump discharge of a mud pump delivering drilling fluid or mud under high pressure to an oil well drilling operation.

The invention will be better understood by reference to the drawing in which

Figure 2:
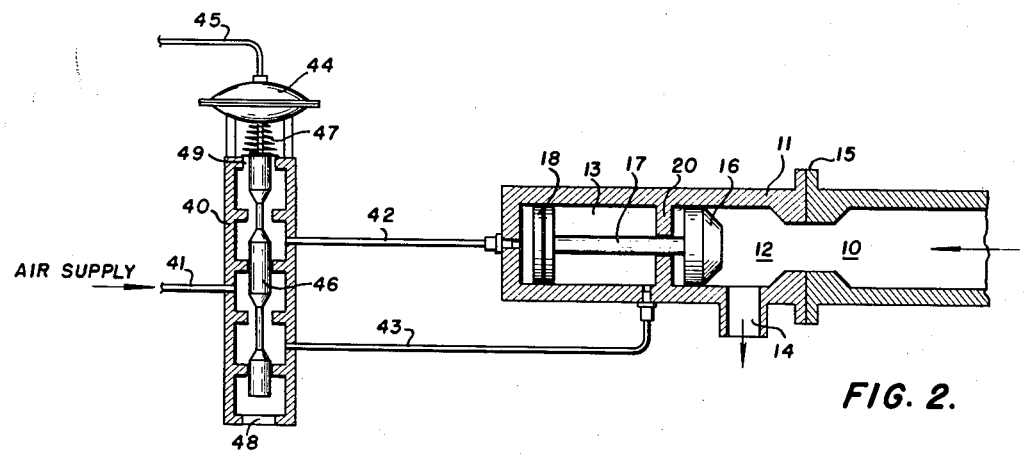
Figure 3:
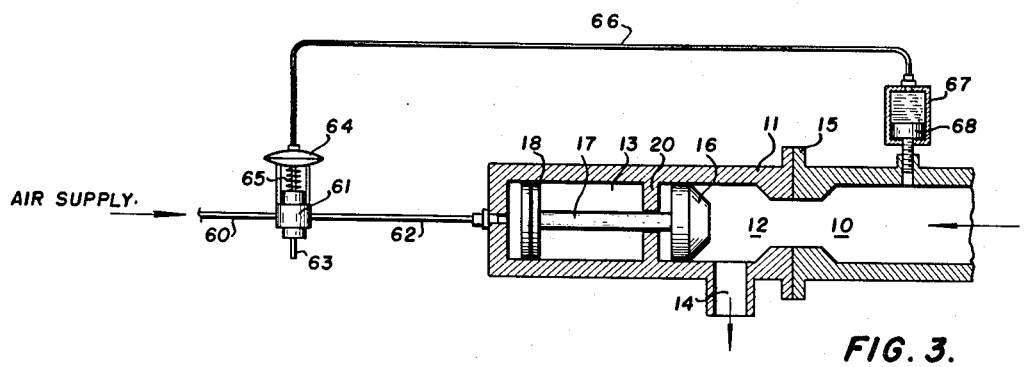

Fig. 1 is an embodiment of our invention in partial section wherein the second piston is provided with a spring for urging the second piston and first piston to close the inlet;

Fig. 2 is another embodiment of the invention wherein a valve, such as a diaphragm valve, is employed and the motivating means includes a conduit for delivering fluid to the second piston at a point ahead thereof; and Fig. 3 is a still further embodiment similar to Fig. 2 wherein the valve is delivering fluid to the second chamber at a point ahead of the second piston, actuated by a pressure responsive means connected to the inlet.

Referring now to the drawing, numeral 11 designates a housing defining a first chamber 12 and a second chamber 13. Housing 11 defines an inlet 10 through which mud is introduced and an outlet 14 by way of which mud is discharged. Although housing 11 is shown as made up of two parts at flange connection 15, it is understood that the housing may be constructed integrally. Arranged in chamber 12 is a first piston 16 connected by an elongated member 17 to a second piston 18 which is provided with a ring sealing member 19. Housing 11 defines a wall member 20 through which elongated member 17 is slidably arranged. Arranged ahead of piston 18 is a compression means, such as a helical coil 21, which bears frictionally against piston 18 and the head 22 of housing 11. The chamber 13 is provided with a discharge port 23 and a port 24 to which is connected a conduit 25. Conduit 25 is provided with a valve 26 which is connected to a constant source of fluid supply, such as air, at constant pressure by way of conduit 27. Valve 26 has a discharge or exhaust port 28.

Referring now to Fig. 2 in which corresponding parts will be indicated by identical numerals, it will be seen that the housing 11 is divided into chambers 12 and 13 and that inlet 10 allows mud to flow into chamber 12 and outwardly therefrom by outlet 14. Piston 16 is arranged in chamber 12 and is connected to piston 18 by elongated member 17 which is slidably arranged in wall member 20. In this embodiment of our invention a diaphragm valve 40 is connected to a source of fluid at a constant pressure by means of a conduit 41 connecting to valve 40 at an intermediate point thereof. A second conduit 42 connects to chamber 13 at a point ahead of piston 18 while a third conduit 43 connects the valve 40 to the second chamber at a point intermediate the wall member and the point where the second conduit communicates therewith. The diaphragm 44 of valve 40 has a conduit 45 connected thereto to cause actuation of the valve. It will be seen that the valve 40 includes a spool-shaped member 46 slidably arranged in the valve in central openings in a series of interconnected chambers. The valve 40 is also provided with a compression means 47 for actuation thereof. From the construction of valve 40, it will be clear that the spool-shaped member 46 is arranged to open and close sequentially the interconnected chambers and to allow flow of fluid from the line 41 to conduit 42 or to conduit 43. It will be further clear that the valve 40 has a first opening 48 to the atmosphere and a second opening 49 also for release of pressure to the atmosphere.

Referring now to Fig. 3 in which corresponding parts will be identified by identical numerals, as in Figs. 1 and 2, the chambers 12 and 13 have arranged therein pistons 16 and 18 interconnected by elongated member 17 which is slidably arranged in wall member 20 of housing 11. A conduit 60 supplies fluid, such as air, at a constant pressure to a diaphragm valve 61 which is connected to chamber 13 by conduit 62. Diaphragm valve 61 is provided with an exhaust port 63, a diaphragm 64 and a compression means 65, such as a spring. The diaphragm 64 is connected by conduit 66 to a pressure responsive means 67 which is fluidly connected to inlet 10 and is mounted thereon. Pressure responsive means 67 comprises a piston 68 arranged therein having above it and in conduit 66 a fluid which transmits changes in pressure in inlet 10 to diaphragm 64 to cause actuation of the valve 61.

The operation of the present invention will be first described with respect to Fig. 1. It will be assumed that the inlet 10 is connected to the pump discharge of a mud or slush pit delivering mud to a drilling operation and it is desired to discharge mud from inlet 10 into chamber 12 and through outlet 14 back into the mud or slush pit, not shown. The compression means 21 normally urges piston 18 interconnected to piston 16 by elongated member 17 to the right so that the inlet 10 is closed by the piston 16, the spring 21 being of sufficient strength to overcome the pressure of mud flowing through inlet 10. Fluid pressure is delivered to valve 26 through conduit 27 and by manipulation of valve 26 high pressure fluid, such as air, is delivered into chamber 13 which urges the piston 18 against the spring 21 causing the piston 18 to move to the left which pulls piston 16 into chamber 12 and opens the inlet 10 allowing the mud to flow into the mud pit through outlet 14. Any air in chamber 13 ahead of piston 18 is bled to the atmosphere through bleed port 23. When it is desired to close the release valve of the present invention, the air pressure in chamber 13 is released to the atmosphere by port 28 by manipulating valve 26 allowing the spring 21 to urge piston 18 and piston 16 to the right causing the inlet 10 to be closed.

The embodiment of Fig. 2 operates in a manner similar to Fig. 1. In this embodiment of our invention a source of fluid pressure, such as air, is delivered to the diaphragm 44 by conduit 45. A source of fluid pressure, such as air, under constant pressure is also delivered to valve 40 by line 41. When the inlet 10 is to be in the open position, as shown in Fig. 2, the valve 40 would be open allowing air to be delivered through conduit 41 to valve 40 and then through conduit 43 to chamber 13 which urges the piston 18 and piston 16 to the left which opens inlet 10 allowing mud to discharge through outlet 14. The fluid in chamber 13 ahead of piston 18 discharges through conduit 42 into valve 40 and by the arrangement of the spool-shaped member 46 to the atmosphere through outlet 49. When the mud flow is to be routed to the drilling operation rather than to the slush pit the diaphragm 44 is actuated by pressure exerted by conduit 45 which causes the spool-shaped member 46 to descend shutting off flow of air through conduit 43 and allowing flow of air through conduit 41 to conduit 42 and causing air to be discharged from chamber 13 through conduit 43 and through opening 48 to the atmosphere.

The operation of the embodiment of Fig. 3 is initiated by changes in pressure in inlet 10 caused by increases or decreases in the mud pressure flowing therethrough. Assuming that the mud pressure increases in inlet 10, pressure would be exerted against piston 68 which would exert pressure against the fluid in pressure responsive means 67 and conduit 66 which, in turn, would be exerted against diaphragm 64 of valve 61. The valve would then be open allowing air to be delivered from conduit 60 to valve 61 and thence by conduit 62 against piston 18 in chamber 13 which would cause piston 16 and piston 18 to move to the right closing off inlet 10. If the pressure in inlet 10 should decrease a predetermined amount, the valve 61 would be closed but the exhaust 63 would be open which would result in the fluid, such as air, ahead of piston 18 in chamber 13 being exhausted to the atmosphere. The pump pressure even though it would be decreased would be sufficient then to move piston 16 and piston 18 to the left allowing the mud to flow through inlet 10 to chamber 12 and outward therefrom through outlet 14 into the mud or slush pit.

The nature and objects of the present invention having been completely described and illustrated, what we wish to claim as new and useful and to secure by Letters Patent is:

A rapidly opening and closing mud release valve comprising, in combination, a housing defining a first chamber having an inlet with a cylindrical wall terminating in a circular valve seat at its point of discharge discharging into the first chamber and an outlet having a cylindrical wall with its axis intersecting the axis of the inlet at a right angle discharging from said first chamber adapted for uninterrupted passage of mud therethrough and a second chamber, a first piston arranged in said first chamber to move along the axis of the inlet to a position with its end in contact with said valve seat to close said inlet and away from said valve seat to open said inlet for uninterrupted passage of mud to said outlet, said outlet being positioned in the wall of said first chamber such that said first piston moves completely past said outlet and out of the path of mud flow when said inlet is open, a second piston arranged in said second chamber, said pistons being connected by an elongated member slidably arranged in an opening in a wall member in said housing between said chambers, a diaphragm valve defining a series of chambers each having a central opening communicating with an adjacent chamber, a spool-shaped member slidably arranged in said valve in said central openings adapted on movement thereof to open and close said chambers sequentially, a first conduit connected to said valve and arranged to deliver fluid to an intermediate chamber thereof, a second conduit connected to said valve adapted to actuate same by delivering fluid against the diaphragm, a third conduit connecting a chamber of said valve adjacent said intermediate chamber with the second chamber of said housing at a point ahead of said second piston, and a fourth conduit connecting a chamber of said diaphragm valve adjacent said intermediate chamber and a chamber in said valve having an opening to the atmosphere with said second chamber at a point intermediate said wall member and the point where said third conduit connects thereto.

References Cited in the file of this patent

UNITED STATES PATENTS

| 1,561,412 | Davis | Nov. 10, 1925 |
| 1,721,204 | Burstall | July 16, 1929 |
| 1,995,561 | Belanger | Mar. 26, 1935 |
| 2,375,914 | Gordineer | May 15, 1945 |
| 2,574,414 | Ragland | Nov. 6, 1951 |
| 2,587,539 | Seaman | Feb. 26, 1952 |
| 2,635,627 | McCarthy | Apr. 21, 1953 |

FOREIGN PATENTS

| 664,746 | Germany | Sept. 5, 1938 |